(12) United States Patent
Connolly

(10) Patent No.: US 6,169,873 B1
(45) Date of Patent: Jan. 2, 2001

(54) AUTOMATED FACE UP AND DOWN DETECTION OF IMAGE INFORMATION

(75) Inventor: Richard P. Connolly, Boise, ID (US)

(73) Assignee: Hewlett-Packard Company, Palo Alto, CA (US)

( * ) Notice: Under 35 U.S.C. 154(b), the term of this patent shall be extended for 0 days.

(21) Appl. No.: 09/464,218

(22) Filed: Dec. 15, 1999

(51) Int. Cl.$^7$ .................................................. G03G 21/00

(52) U.S. Cl. ......................... 399/365; 399/374; 399/363

(58) Field of Search ..................................... 399/211, 364, 399/365, 361, 363, 374; 358/494, 496; 355/23, 24

(56) References Cited

U.S. PATENT DOCUMENTS

| | | | |
|---|---|---|---|
| 4,123,155 | 10/1978 | Hubert | 355/26 |
| 5,298,937 | * 3/1994 | Telle | 355/23 |
| 5,463,451 | * 10/1995 | Acquaviva et al. | 355/233 |
| 5,634,187 | 5/1997 | Ross | 399/365 |
| 5,725,211 | 3/1998 | Blanchard et al. | 271/265.02 |

* cited by examiner

Primary Examiner—Richard Moses

(57) ABSTRACT

An automatic sheet feeder is provided with a controller and the controller is provided with a scanning input and user-controlled inputs. Sheets provided at the feeder are scanned to determine image status with regard to face up/face down orientation and simplex/duplex image presentation. The scanned input compared with pre-established and user-provided data.

10 Claims, 2 Drawing Sheets

AUTOMATED FACE UP AND DOWN DETECTION OF IMAGE INFORMATION

FIELD OF THE INVENTION

The invention relates to paper handling, and more specifically to paper feeding and scanning of an original sheet placed onto a scanning device for a scanner or copier. More specifically it relates to automated sheet feeding of original sheets in a paper handling machine.

BACKGROUND OF THE INVENTION

This invention relates to paper handling. The paper handler manipulates sheet media which may include paper or other materials which have or receive a printed image. Unless a particular process is specific for paper as such, paper handling can be used with any appropriate form of sheet media.

Scanners and copiers often include the feature of automatic paper feeders for originals. In a simplified form, the automatic paper feeder feeds sheets which must be either placed face down or face up in the paper feeder. If the original is placed in the wrong face up or face down orientation, the wrong side of the sheet gets copied on single sided copies. The result is a reproduction of a blank sheet. When using a single sided scanner in the process of making copies, the function of placing paper into the scanner's automatic document feeder requires that the printed side of the document is oriented toward the scanner. If a single sided scanner is used with a two sided feeder to scan a dual sided original source, the side of interest must also be oriented correctly.

In paper feeding, "sheets" are considered to have two sides. An image is the printed material on one side of a sheet, although it is also possible to have a side of a sheet with no printed material in which case that side of the sheet would have a "blank image". A "page" is normally used to refer to one side of a sheet. A document may have one or more pages and is referred to as "simplex" if the images are printed on one side of each sheet and "duplex" if images are printed on both sides of the sheets.

In many cases, a "duplex" print job or other paper handling job may include individual sheets which have images on one side of the sheet only, although in other cases mixed simplex and duplex sheets may occur in a single print job because the print job is an assembly of different documents. The occurrence of simplex and duplex sheets in a single print job is most likely to occur when the print job includes a collection of sheets from different sources, although there are cases in which documents from a single source have mixed one-sided and two-sided sheets. Someone scanning such a paper handling job may wish to retain the duplex and simplex combination of the original or convert the entire job to simplex or duplex documents.

An "original" refers to a document or set of sheets which are to be scanned for their image content. The present invention concerns itself with "hard copy" originals, so the original would be in the form of an image on paper or other sheet media. In the sense of this invention, a "copy" may be in the form of a hard copy or an electronic (digital) copy. For example, if an original is stored electronically, no hard copy may be made, but an electronic copy is created.

The "orientation" of a document may include a face-up and face-down orientation of a stack, as well as top/bottom orientation in which the text of a document reads right side up or upside-down. It is also possible that the order of sheets may be such that the first sheet is on the bottom of a stack and the left sheet is on top, so that the order of pages is 2, 1, 4, 3, 6, 5, . . . or the inverse of such a sequence ( . . . , 5, 6, 3, 4, 1, 2).

The paper feeder may be simplex or duplex, although for simplicity, it is possible to describe a duplex paper sheet feeder as a "page flipper". A duplex feeder or a page flipper is a feeder which physically turns a page from face up to face down or vice-versa.

If two-sided scanning is provided, an "auto select" function in the operating code of the machine would be advantageous. In this manner, faults resulting from wrong face side paper feeding can be corrected without causing the user to have to "fight with" the equipment in order to achieve a desired result. In a broader sense, it would be advantageous if a scanning device is able to correct stack inversion, detect duplex and simplex originals, and limit such detection to predictable patterns so as to speed image processing. The scanning device should perform such functions only when the nature of the paper handling job warranted these features.

In configuring paper handling equipment to provide desired results, it is often the case that adding a feature can, in some cases, increase the difficulty working with the equipment. For example, is a paper feed device is designed to sense two-sided originals would not automatically know whether the user wished to have copies of both sides or only one side. Thus, a feature which would be convenient for someone who intends to automatically detect and copy both sides of a two-sided original may prove to be an inconvenience for someone who wishes to copy only one side.

To complicate this, it is possible that a user may be under the impression that all of the originals are single sided copies, but it turns out that two-sided copies are embedded within the stack. Thus, the ability of paper handling equipment to perform more functions does not always increase convenience for the user. It would be desirable to permit the user to be able to detect such embedded two-sided originals. It would be further advantageous to then allow the user to determine how such two-sided originals are to be handled after they are detected. On the other hand, in many cases the user knows straight away that originals are either simplex or duplex, and so would not wish to scan for mixed simplex/duplex sheets.

There are instances when an original is fed upside down either purposely or accidentally in some instances it is desired to provide an image output which is right side up.

The present invention contemplates providing additional preliminary data interpretation while scanning of an original document prior to final paper handling. This can save some time by evaluating the document to be handled; however the processing itself consumes time. Some prior art copiers will pre-scan a first page for image darkness, but this process substantially increases the time necessary to make the copy. In order to reduce time on multiple sheet jobs, only a first sheet would be scanned and the remainder of sheets are presumed to have the same image sense.

If pages are to be pre-scanned for content, this may increase total scanning time considerably. In some cases this process is desirable because the user is not certain as to the simplex/duplex nature of the originals. In other cases the user is certain whether the originals are simplex or duplex and would not wish to wait for the paper handling machine to verify what the user already knows. It is therefore an object of the invention to provide a paper feeder which can verify status but does not cause undue delay to the user in instances where such verification is not desired. While it is possible to completely scan a document on two sides prior to using the data or reproducing the document, this also causes problems. It is often desired to speed the processing of data by transmitting, reproducing or otherwise manipulating the data prior to completely scanning the entire print job. This particularly becomes an issue where large documents are involved, and to a lesser extent becomes a problem where multiple pages are involved in any size document. On the other hand, there are cases when the user requires such scanning, so that in these cases the user would have to manually scan the sheet for variations in simplex/duplex status of the individual sheets.

When a document is scanned, it is possible for the duplex original to have some pages printed only on a single side. This is fairly common on lead sheets and trailing sheets. For example, if a document has an odd number of page images, the last sheet may be printed on only one side. In other instances, the cover sheet may intentionally be printed on one side, with remaining sheets printed on two sides. This also leaves the possibility that the last side of the last sheet may be printed on either one or two sides. Thus, it can be seen that a document can have blank images on different sides of beginning sheets regardless of whether the original is loaded to a paper feeder front side up or front side down. While a complete scan of the entire document would reveal the correct orientation of the sheets, it would be desirable to detect full document orientation a priori.

SUMMARY OF THE INVENTION

According to the invention, auto select would decide which side of sheets to copy automatically and whether to copy both sides if the source is a dual sided original. Set points are placed in the operating software or hardware to allow this feature to operate. On each scanned side, up to a default amount of set points are provided which is a low or high number. This is suitable for a dual sided scanner, but a single sided scanner could do this function by flipping the page as required by the input sense information and then deciding to flip or not.

According to one aspect of the invention, if a scanned original has a predetermined number of image points, the scanned original is assumed to be oriented as desired with respect to the face up or face down condition. If the scanned original has a number of image points consistent with a blank sheet, the scanned original is assumed to be upside down. According to one aspect of the invention, if the scanned original is assumed to have reverse orientation with respect to front and backside, the paper feeder flips the original over and the reverse side is scanned to determine if sufficient image points exist to suggest a scannable image.

According to another aspect of the invention, both sides of the originals are scanned to an extent necessary to determine if the set points indicate an image present. At that point the data is used in an automatic feed sheet feed process.

According to a further aspect of the invention, the originals are scanned and then flipped over and scanned a second time. If one of the sides does not display sufficient image points to suggest a scannable copy, the sheet is considered to be blank. If that presumed-blank sheet is within a series of duplex sheets, that sheet is assumed to be in a correct orientation with one side intentionally blank. If that sheet is within a series of sheets with one sided printing, that sheet is assumed to be flipped over and scanning is performed on the side with the printed information.

In the preferred embodiment, one of several options are user-selected, so that should a fault be detected, the paper handling equipment will respond in a desired manner. The selection can result in reorientation being performed automatically, the operator being warned of an orientation fault, detected orientation errors being can be ignored immediately or detected orientation errors being ignored after a predetermined time period. In this manner the option can be selected by the user.

In accordance with a further aspect of the invention, if a multiple sheet original is scanned, the multiple sheets are tested for image presentation on both sides. If a predetermined number of image points appear on one side of the sheets but not another, the scanner reproduces that side of the sheets on which printed information is indicated by the predetermined number of image points.

In accordance with one aspect of the invention, a plurality of sheets are scanned until a simplex or duplex pattern of printed images on the sheets is recognized. When the pattern is recognized, the user is provided with information as to a detected format of the sheets. Thus, if a first sheet appears with images on two sides, the operator is notified that a two-sided original has been detected. If a first sheet appears as a single-sided original, a second sheet is scanned in order to determine the number of sides printed. In many cases, this will provide an indication of simplex or duplex originals. It is, however, possible to continue the scanning either through a few pages, or throughout the entire document.

In accordance with one aspect of the invention, the scanning of the documents to determine the simplex or duplex status of the document is used to confirm a user input. If the user input is set at automatic, the information obtained from the scanned pages is used to make a determination of the simplex or duplex status of the document. If, however, the user input one type of document status and the scanner detects another type, an error flag is raised and the user is notified of the error. At that point, the user may elect to continue with either the detected status or the user's preselected input status of the original document.

In another aspect of the invention, a scanning device is used in combination with user pre-selections in order to provide improved automated sheet feeding. The invention may allow the user to choose simplex/duplex status, with the scanning providing a confirmation of the status. The user may elect degrees of confirmation, user control and machine control in accordance with need, type of document and desired amount of user and machine supervision.

In another aspect of the invention, optical character reading (OCR) to an extent performed is needed to establish whether an original is upside down. This provides the options of providing an image reversal when outputting a scanned image.

In accordance with another aspect of the invention, a document is scanned to detect whether its orientation is in an assumed face-up or face-down direction, or opposite. If the document is determined to be simplex, the images from the document are processed. If the image on the document is detected as facing in an unexpected direction, the user may be notified and may elect to continue to process the original in either the detected face-up or face-down orientation or in a orientation as selected by the user.

In accordance with a further aspect of the invention, a document is scanned or pre-scanned. If a document consists of mixed simplex and duplex sheets, the duplex sheets are detected and are part way scanned for use of the data. This eliminates the need to fully scan blank images, while dividing complete copies of originals which may include two-sided sheets within the document.

DETAILED DESCRIPTION OF THE INVENTION

Figure 1:
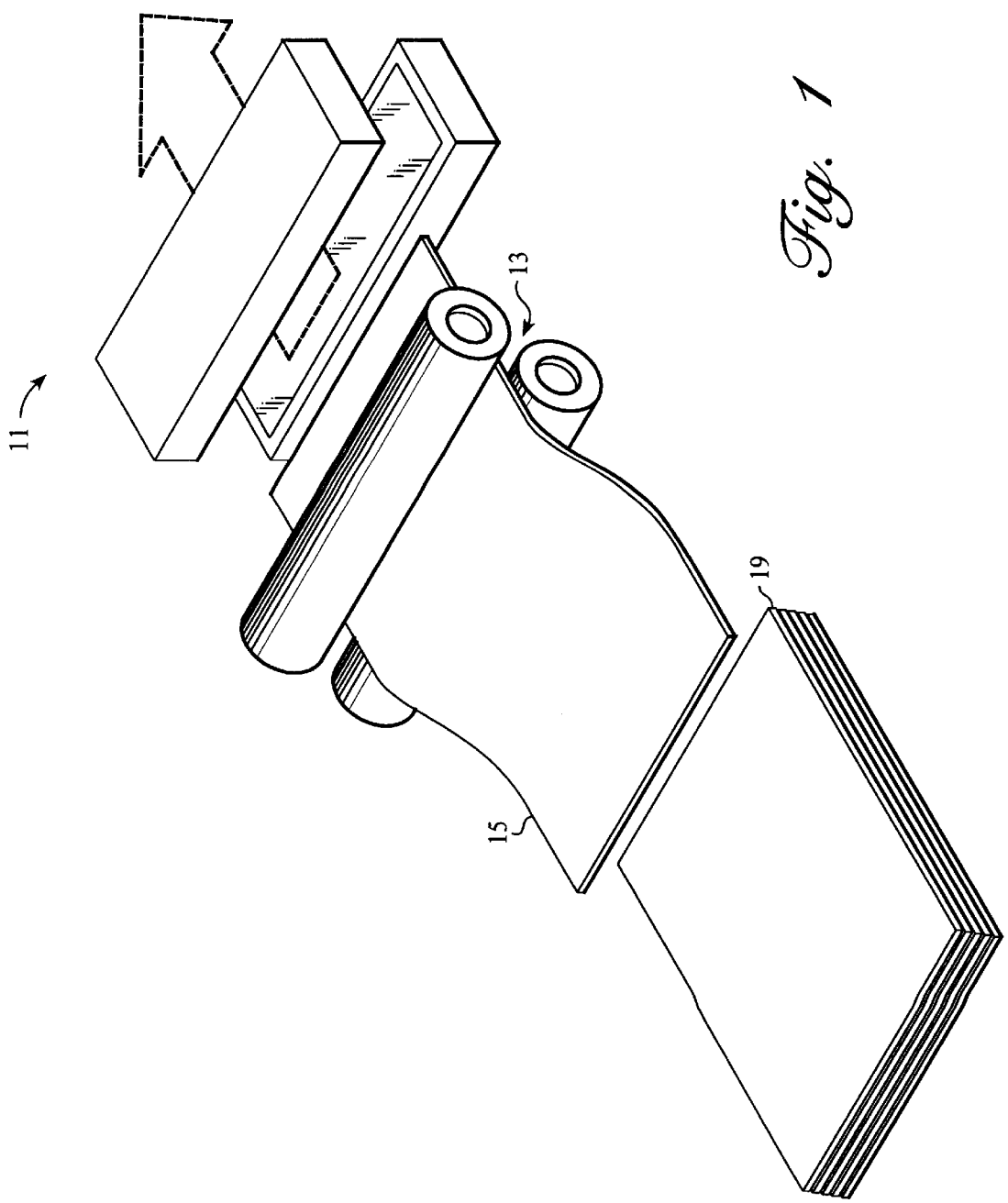
FIG. 1 shows a scanning device with a sheet feeder.

Referring to FIG. 1, a scanning device 11 is depicted. The scanning device 11 can either be a scanner, a scanning copier, an electrophotographic copier, a facsimile machine or another type of sheet media scanner. As is becoming more common, the scanning device may have a multiplicity of the above functions, such as a combined copier, scanner, and printer. Included in the scanner 11 is a sheet feeder 13, shown processing a sheet 15 of sheet media. The sheet media is typically paper, and the present invention is intended to detect image information inscribed on the paper. The feeder 13 is able to process multiple sheets 19 of sheet media. In order to scan duplex sheets, either the scanner 11 would have a capability of scanning two sides of the individual sheets or the sheet feeder 13 would flip the individual sheets over so that a single side scanner can scan a reverse side. In either case, the effect is to obtain scans of two sides of each sheet as desired.

In loading a plurality of sheets 19, it is not always intuitive as to whether the stack of sheets should be loaded face up or face down. This face up or face down orientation of course affects the scanning of the sheets. In the case of a duplexing sheet feeder, also known as a "page flipping" sheet feeder, the sheet feeder 13 withdraws individual sheets from the stack of sheets 19 and first passes the individual sheets in a first orientation across the scanner 15. The sheet feeder 13 then reverses the face up/face down orientation of the sheets 19 and again passes the sheets 19 across the scanner 15. This may either be accomplished one at a time, in a manner of the organization of most documents, or in bulk, meaning that after a first side of all of the sheets in the stack are scanned, the second side of all the sheets are scanned.

There are advantages to both techniques, and the technique chosen in part depends upon the capability of the scanner. For example, if the scanner is easily able to store copies in a paper bin, it may be advantageous to scan one side of all the sheets, followed by scanning the second side. On the other hand, if the scanner is to have a capability of transmitting the scanned information "on the fly", then it would be advantageous for the sheet feeder 13 to reverse each individual copy prior to the scanning the next copy.

During the scanning process, image information on the sheets appears as image points. Normally this results from dark pixels corresponding to the printed information. If a blank sheet is scanned, very few dark pixels will appear. The number of dark pixels will, of course, vary, since false image artifacts may occur, as well as blemishes on the original and in some cases small amounts of text information. It is, however, possible to electronically determine whether the small amount of image information is consistent with a blank sheet or if the sheet has printed data on it.

If any of the sheets are reversed with respect to the face down orientation, the scanner that provides as a final output images of those sides of sheets which is presumed are intended for image transfer. It is also possible, by use of an optical character reader (OCR) to determine if sheets are oriented upside down. Since the purpose is detection of orientation, the OCR need only provide limited interpretation of the scanned dates.

In some cases, a duplex printed document will have a few blank sides. This is normally intentional and the blank side is normally intended to be either reproduced or a blank image produced in place of the sheet (in order to reduce artifacts). On the other hand, if all of the sheets in the stack 19 have image information on one side, it would normally be assumed that the originals are single sided originals. The scanned information can then be used to determine:

1. which side is the intended face side to be reproduced; and
2. if any of the single sides have been reversed in the stack 19.

There are, of course, a number of techniques to accomplish duplex scanning. If the scanner 11 is capable of scanning both sides without mechanically flipping the originals, then the selection of face up and face down scanner outputs can be accomplished by merely determining which image is to be output from the duplex scanner. It is possible to provide an indication of when pages are blank within a document which otherwise shows printed images in order to provide a flag for the user, or to intentionally provide a blank image, thereby reducing artifacts on blank pages.

Figure 2:
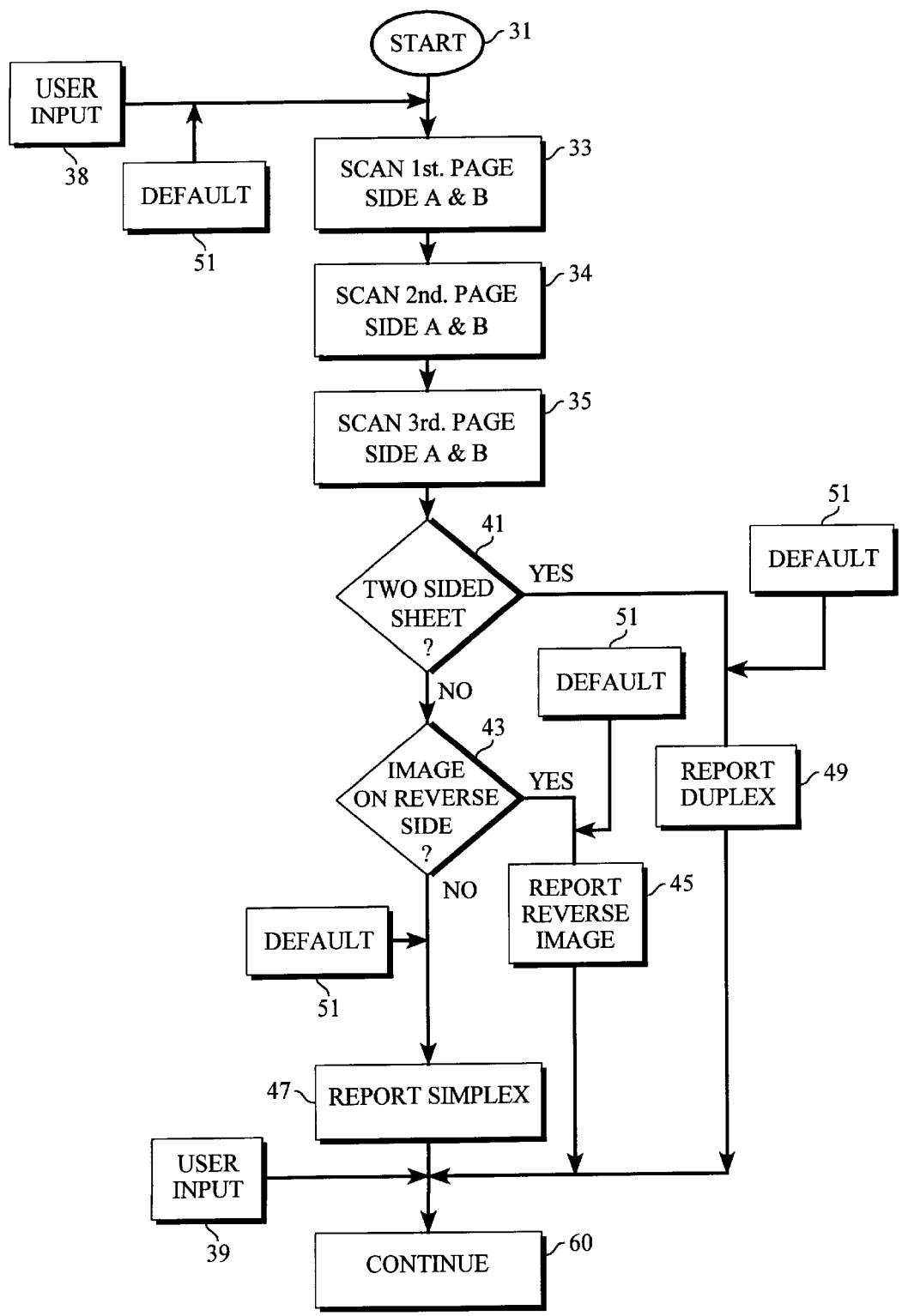
FIG. 2 shows a flow chart where scanning is used to determine sheet orientation of scanned images and to determine simplex/duplex status.

Referring to FIG. 2, a document provided to the sheet feeder 13 (FIG. 1) is scanned in order to determine, among other required functions, if images appear on one or both sides of the first pages. When a job is started, as indicated at 31, the first few sheets can be scanned on both sides, as indicated at blocks 33–35. If the images appear on both sides of the pages, then the sensed scan of the document is duplex. The user's inputs are then compared with the information obtained from the scanning. A variety of inputs may be provided by the user, as indicated at blocks 38, 39, and no user input would assume a default user selection, indicated at the several blocks marked 51.

If the information obtained by scanning coincides with user input, then the document is preferably processed with no further user input. By way of example, the user input, at 38, may indicate a duplex original. The scanning in steps 33–35 would confirm this. In the preferred embodiment, at least one duplex original would be detected out of the first three pages. In this case, the user input at 38 or 39 may be: 1) automatic; 2) automatic-all pages same duplex status; 3) duplex; 4) some pages duplex; or 5) all pages simplex.

On the other hand, if images are detected on one side of each of the sheets at block 41, the orientation of the document must be assumed. This is done by comparing the orientation with the user's input: 1) automatic; 2) simplex; and 3) mixed simplex and duplex.

If, as indicated at block 43, the orientation is such that reverse indication is sensed, the user is notified as to the face up/face down orientation error. If the setting for the paper processing is "automatic" then the proper side is copied; however, if this is not the case then the error is flagged to the user, as indicated at block 45. As indicated at "User Input" block 39, the user may either correct the orientation or request that the paper processing continue, but using the images on the reverse side. Alternatively, the user may override the detected orientation and insist on copying what has been detected as the "wrong side".

If the sheets are detected with images only on the front side, this is reported, as indicated at block 47 and if the sheets are detected as duplex, this is reported, as indicated at block 49. In each case, the system uses defaults 51. By the use of defaults, a desired "normal" operation, once confirmed, results in a desired output. In the preferred embodiment, the defaults 51 can be selected so as to be suitable for a particular operating environment. The defaults 51 can include a response to no detected user inputs 38, 39, so that the user may ignore the prompts and the system will process the sheet media in a predetermined manner, as indicated by "Continue" block 60.

The case of mixed simplex and duplex originals is a special case. In some cases it is desired to copy or scan the original so as to reproduce the copy with the same mixture of simplex and duplex originals. Since it is possible to detect which sheets are simplex originals, the actual image processing is accomplished only on the desired side. On the other hand, if the output is a simplex output of all sides with printing, it is only necessary to scan the images and retain the order of the images. This requires that the copies be sequenced. Then the sequence of originals is retained, but without copying the blank images.

If the original is provided as a simplex original and image detection continues throughout the paper feeding process, then it is possible to notify the user that two-sided original has been detected or to automatically scan both sides. Alternatively, the user may, at block 38, elect to only scan one side of the document, regardless of a sensed condition.

In a similar manner, it is possible that a single sheet may become inverted in its face up/face down orientation. If scanning of both sides of the sheet is provided for, then the sheet feeder 13 (FIG. 1) may use the scanning to provide information in which indicates that the particular sheet has been inverted. This assures the user that the scanned information includes valid image information.

Since the pages are analyzed during the scanning process, it is further possible to provide indicia of whether the pages are fed inverted. For example, it is sometimes the case that the top edge of a sheet is damaged in the manner that makes it expeditious to feed the sheet upside down with respect to the top and bottom of the sheets. If the sheets are transmitted serially, such is the case for facsimile transmissions, it is desired that the facsimile transmission be effected by transmitting the images right side up with respect to the top and bottom of the sheet. If an optical character reader is used to analyze the image information, the output of the scanner can be provided in a manner in which coincides with a reasonable OCR analysis of the page. This allows the user to selectively insert the pages into the scanner in a manner which is contemplated to best facilitate feeding of the pages, regardless of orientation of the page. If OCR analysis is only used for analyzing page orientation, then "reasonable OCR analysis" need not include such items between similar characters or otherwise deglitching an OCR scan output.

In a similar manner, mixed one and two sided sheets may be scanned and this scanned output may be provided such that the scanned output consist only of those sides of the sheets which have image information on them, with images of blank sides deleted.

As can be seen, various modifications can be made by those of ordinary skill in the art with the benefit of this disclosure without departing from the spirit and scope of the invention. Thus, the invention should not be limited by the specific embodiments used to illustrate it but only by the scope of the appended claims.

What is claimed is:

1. A method for scanning images, the method comprising the steps of:
   a. sensing image information on first and second sides of at least a first sheet of a plurality of sheets of sheet media;
   b. using theسensed information to determine which of the sides have image information and to determine a procedure for sensing further ones of the plurality of sheets; and
   c. providing, as a scanned output, images selected in accordance with the sensed information.

2. The method as described in claim 1 comprising the further steps of:
   a. querying a user for obtaining selection criteria; and
   b. using the selection criteria to determine a procedure in combination with the sensed information in selecting the output images in accordance with the sensed information.

3. The method as described in claim 1 comprising the further steps of:
   a. querying a user for obtaining selection criteria; and
   b. selectively performing the sensing of image information on first and second sides of the plurality of sheets and providing the scanned output of images.

4. A paper handling apparatus having a capability of processing images on two sides of sheets of sheet media provided at an input sheet feeder, comprising:
   a scanning mechanism adapted for sensing image information on first and second sides of at least a first sheet of the sheet media to determine whether an image appears on each of the first and second sides of the sheets provided at the input sheet feeder, the scanning mechanism using the sensed information to determine a procedure for sensing further ones of the sheets; and
   equipment for selecting between duplex and simplex image processing, including a controller program to select between said simplex and duplex image processing, and for providing an indication of the image appearance consistent with simplex or duplex status of the sheets at the input sheet feeder;
   wherein the sensing provides automatic selection of simplex and duplex copying, and further provides information concerning the face up and face down orientation of simplex sheets.

5. The paper handling apparatus of claim 4, further comprising:
   a controller circuit accepting a user selection criteria; and
   the controller circuit using the selection criteria to determine a procedure in combination with information from the scanning mechanism in the selection between duplex and simplex image processing.

6. The paper handling apparatus of claim 4, further comprising:
   a. a controller circuit accepting a user selection criteria by querying a user for obtaining selection criteria; and
   b. the controller circuit selectively enabling the sensing of image information on first and second sides of the plurality of sheets and providing the scanned output of images.

7. Method for automatically feeding sheet media as originals, the method comprising:
   a. determining a user selection and using the user selection as a predetermined format for said originals in a print job;
   b. sensing image information on first and second sides of a plurality of sheets of said originals, said plurality of sheets comprising said print job;

c. using the sensed information to determine which of said sides have image information;
d. comparing the sensed information with anticipated patterns for said originals with respect to images on the first and second sides in the print job; and
e. providing scanned output images selected in accordance with said sensed information.

8. Method as described in claim 7 comprising:
a. sensing image information on first and second sides of at least a first sheet of the sheet media; and
b. using the sensed information to determine a procedure for sensing further ones of the plurality of sheets.

9. Method as described in claim 7 comprising:
a. querying a user for obtaining selection criteria; and
b. using the selection criteria to determine a procedure in combination with said sensed information in selecting the output images in accordance with said sensed information.

10. Method as described in claim 7 comprising:
a. querying a user for obtaining selection criteria; and
b. selectively performing the sensing of image information on first and second sides of the plurality of sheets and providing the scanned output of images.

* * * * *